Dec. 30, 1947.  G. R. COSS  2,433,602
REUSABLE TYPE HOSE COUPLING
Filed March 26, 1947
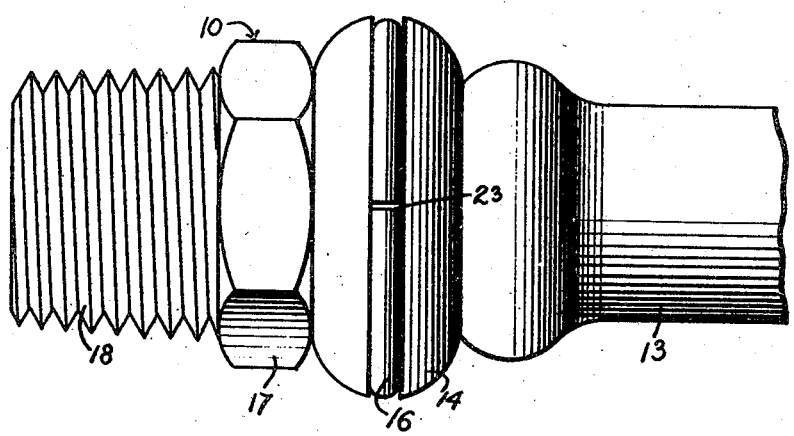
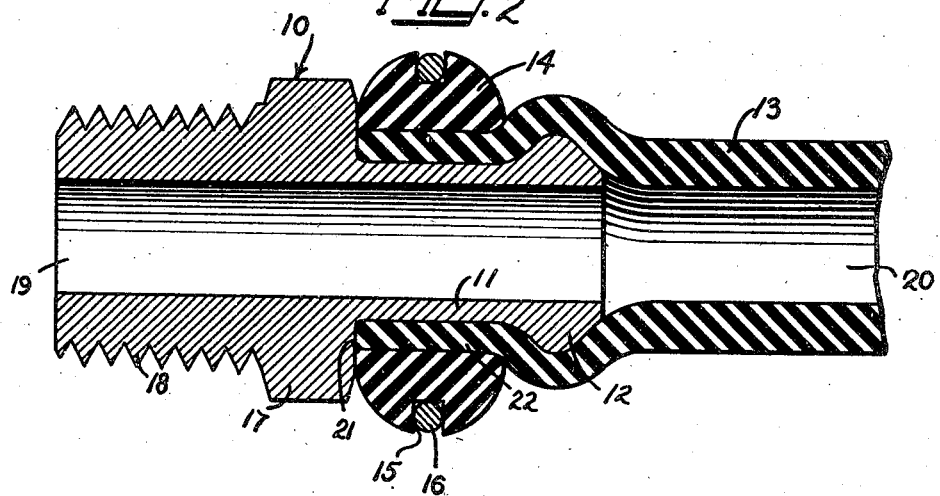
Inventor
George R. Coss Patented Dec. 30, 1947

2,433,602

UNITED STATES PATENT OFFICE 2,433,602

REUSABLE TYPE HOSE COUPLING

George R. Coss, St. Clair Shores, Mich., assignor to Flex-O-Tube Company, Detroit, Mich., a corporation of Illinois Application March 26, 1947, Serial No. 737,228

10 Claims. (Cl. 285—84)

This invention relates to improvements in hose couplings and more particularly to a hose coupling adapted for use with flexible tubing or hose from which the coupling may be removed for reuse.

An important object of the present invention is to provide a new and improved, simple and efficient reusable hose coupling especially adapted for affording a coupling at the end of a flexible tube or hose from which the coupling may be readily removed for reuse on another piece of hose.

Another object is to provide a hose coupling which is adapted to be applied to the end of a flexible hose or tube by slipping the end portion of the hose onto the nipple of the coupling member, assembling a grommet type resilient annulus on the nipple to effect a clamping grip upon the hose end and then completing the attachment of the coupling to the hose by assembling a spring retainer ring in a peripheral groove of the annulus to effect a clamping grip through the annulus upon the hose end, the pressure of the broad surfaces of the annulus affording a non-slipping and leakproof connection of the hose end with the coupling.

Another object of the invention is to provide a hose coupling including only a single machined part and arranged to be assembled in such a manner that, as an incident to securing the hose to the coupling member, a rubber-against-rubber clamping surface prevents the hose from slipping off the coupling member.

Still another object of the invention is to provide a novel hose coupling for flexible tubing or hose in which the clamping force of a split metal ring is transmitted by a broad resilient annulus to the end of the hose, whereby any slight variations in dimensions or irregularities of the coupling member or hose will not interfere with leakproof and non-slipping coupling.

Other objects, features and advantages of the present invention will be readily apparent from the following detailed description of a preferred embodiment thereof taken in conjunction with the accompanying drawings, in which:

Figure 1 is a side elevational view of a hose coupling embodying the features of the invention and showing the same attached to a flexible hose; and Figure 2 is a longitudinal sectional view through the coupling and hose of Figure 1.

As shown on the drawings:

A hose coupling according to the present invention preferably comprises a tubular body part 10 having a nipple 11 with a peripheral protuberance or flange 12 at the end thereof, the nipple 11 being adapted to receive the end portion of a flexible hose 13.

A grommet type rubber annulus 14 is stretched over the protuberance 12 and clamps the end portion of the hose 13. The annulus 14 has a central peripheral groove 15 adapted to receive a split spring metal retainer ring 16 for clamping the hose end portion, into a non-slipping, leakproof assembly with the nipple 11. The body 10 and clamping members 14 and 16 are readily separable to release the flexible hose 13 when it is desired to reuse the coupling on another hose. The present coupling is especially valuable for use with soft rubber hose.

The coupling body 10 includes a lateral intermediate flange 17 having conventional wrench faces thereon and from the side of which flange opposite the nipple 11 exends an externally threaded stem 18. The bore of the coupling body 10, identified at 19, may be of substantially the same diameter as the bore 20 of the hose 12.

The flange 17 provides an annular shoulder 21 against which the hose 13 and annulus 14 abut and which may form a portion of the sealing surface between the hose and the coupling body 10. The width of the annulus 14 is so proportioned that when it contracts into the groove between the protuberance flange 12 and the shoulder 21 one end rests against the shoulder 21 and the other end engages the end portion 22 of the hose 13 immediately inwardly of the protuberance 12. The annulus 14 is preferably formed to have an inner diameter approximately equal to the outer diameter of the hose 13 so that when it is applied to the expanded end portion of the hose on the nipple 11, it exerts a resilient clamping pressure thereon.

The end of the annulus 14 adjacent the shoulder 21 tends to flatten when the spring retainer ring 16 is placed in clamping relation therearound, tending to provide a further seal for the coupling.

As indicated in Figure 2, there is a broad contact surface between the annulus 14 and the end portion 22 of the hose 13 so as to ensure non-slipping. The protuberance 12 prevents the annulus 14 from slipping off the nipple with the hose, and thereby effects an interlock for the hose end in co-operation with the annulus.

In assembling the coupling of my invention, the split ring 16 and annulus 14 may be slipped on to the free end of a hose 13 which is to be coupled with the body 10. The end portion 22 of the hose is then stretched and slipped over the protuberance 12 onto the nipple 11 of the body, the end of the hose resting snugly against the shoulder 21 of the flange 17. The annulus 14 is then stretched over the protuberance 12 to abut against the flange shoulder 21, the spring retainer ring, which is split, as indicated at 23, is then expanded to fit over the nipple and bulged portion of the hose and into the annular peripheral groove 15 in the central portion of the annulus 14. Contraction of the spring retainer ring 16 forces the annulus 14 even more firmly against the end portion 22 of the hose than results from the natural resilience of the annulus and the greater width of the annulus distributes the clamping pressure of the ring 16 over the contact area of the hose end to hold it in non-slipping leakproof coupling with the body portion 10.

It will be appreciated that slight variations in the dimensions of the hose coupling are readily compensated for by virtue of my flexible arrangement.

The clamping means of my invention are sufficiently resilient to "give" when swelling occurs without injuring the hose and still maintain a constant clamping action to prevent leakage. This advantage may be enhanced by employing a rubber annulus which is made of the same compound as the hose and will therefore expand and contract proportionately when subjected to fluids or conditions that cause swelling and contraction. The metallic ring assures increased and substantially uniform clamping action.

A further advantage of my coupling is that a swivel type connector need not be employed on either end of the hose to apply the hose assembly between two fixed members. A swivel type connector is ordinarily used to prevent twisting the hose unless it happens that one end of the hose assembly is screwed onto a small unit that can be rotated conveniently.

In my invention one end of the hose may be connected by means of a threaded coupling to one of the fixed members turning the hose with the coupling so that the hose is not twisted. Thereafter the other end of the hose may be applied without turning to the novel coupling body of my invention. A readily attachable and detachable connection is thus effected without the use of swivel type connectors.

Should it become desirable to remove the hose 13, all that need be done is to expand the retainer ring 16 and withdraw it from the groove 15 over the protuberance 12 onto the hose 13. The annulus 14 is then expanded and likewise withdrawn over the protuberance 12 onto the hose 13, so that the end portion 22 of the hose may then be pulled free. The coupling may then be reused.

The term "rubber" is used herein in a generic sense and either natural or synthetic rubber or plastics having similar resilient, flexible characteristics are included. For example, in some instances a rubber-like material such as "neoprene" may be used. In any event, the material of the annulus must be resiliently yieldable and flowable when subjected to a compressive force.

It will, of course, be understood that various details of construction may be varied through a substantial range without departing from the principles of this invention, and it is, therefore, not the purpose to limit the patent granted hereon otherwise than necessitated by the scope of the appended claims.

I claim as my invention:

1. In combination in a flexible hose coupling, a coupling body having a nipple with a protuberance at the end thereof adapted to receive an end portion of a hose, a contractile annular member having a peripheral annular groove therein and fitting clampingly about said end portion inwardly of said protuberance, and a split resilient retainer ring contracted into said groove for resiliently increasing the clamping action of the annular member upon the end portion of said hose on said nipple.

2. In combination in a reusable hose coupling, a coupling body including a nipple adapted to receive an end portion of a hose, a rubber annulus adapted to fit over said end portion of the hose to retain it on the nipple, and a resilient member fitting about said rubber annulus to retain it in place.

3. In combination in a flexible hose and coupling assembly of the character described, a coupling body having a peripherally flanged nipple adapted to receive an end portion of the hose stretched thereover, a resilient member overlying said end portion of said hose inwardly of the nipple flange, and resilient means clamping said member against the end portion of said hose, whereby to prevent slipping of said hose end portion over said flange.

4. In combination in a hose and coupling assembly, a flexible hose, a coupling body having an end portion of the hose slipped thereover, a first annular resilient member surrounding the end portion of the hose and having a peripheral annular groove, and a second resilient member in said groove and clamping said first resilient member against the end portion of said hose.

5. In combination in a hose coupling, a member constructed and arranged to engage within an end portion of a flexible hose, a resilient member surrounding said end portion of said hose, and a clamping member urging said resilient member against said hose end portion.

6. In combination in a reusable hose coupling, a coupling body having a flange providing a shoulder and a nipple extending from said shoulder, said nipple having an annular protuberance at the end thereof and adapted to receive an end portion of a hose stretched over said protuberance and lying between said shoulder and said protuberance, a rubber annulus adapted to stretch over said protuberance and overlie the end portion of said hose, and a split metal retainer ring adapted to engage said annulus for clamping action thereagainst to hold said hose on said nipple.

7. In combination in a hose coupling, a coupling body constructed and arranged to engage within an end portion of a flexible rubber hose, and a resilient retaining member made of a rubber compound having similar expansion and contraction characteristics as those of said hose surrounding a substantial part of said end portion of said hose and acting to clamp it to said body.

8. In a combination in a hose coupling, a tubular coupling body having a flange providing a shoulder and a nipple extending from said shoulder, said nipple having an annular protuberance at an end thereof for receiving an end portion of a hose stretched over said protuberance and lying between said shoulder and said protuberance, an annulus of resiliently yieldable material so as to be stretched over and beyond said protuberance to overlie the end portion of said hose between the protuberance and shoulder, and a metal retainer ring engaging the periphery of said annulus for both laterally and radially flowing the material of the annulus on the nipple to fasten the hose end in place on the nipple.

9. In combination in a hose coupling, a tubular coupling body having an external flange and an adjoining protuberance receiving an end of a hose including a portion lying between said flange and said protuberance and a portion overlying said protuberance, and an annulus of resilient material overlying the hose portion between said flange and said protuberance and retaining the hose end on said body by laterally expansive wedging action between said flange and said protuberance and against a part of the hose portion overlying said protuberance.

10. In a hose coupling structure including a tubular nipple having an enlarged protuberance over which the hose end is stretched and a shouldered flange portion for receiving the hose end, an annulus of resiliently yieldable material lying between the protuberance and the flange shoulder after having been stretched over the protuberance, and means for exerting a radially inward compressive force against the annulus for flowing the material of the same tightly against the hose end on the flange portion and for laterally wedging the annulus between said shoulder and protuberance whereby said hose end is tightly locked to the nipple without mechanical indentation of the hose.

GEORGE R. COSS.